United States Patent
Claeys et al.

(10) Patent No.: US 7,011,580 B2
(45) Date of Patent: *Mar. 14, 2006

(54) ELEVATOR FOR AN AGRICULTURAL HARVESTING MACHINE

(75) Inventors: Geert Claeys, Sint-Michiels (BE); Rudy Vandewalle, Zedelgem (BE); Eric A. H. Maertens, Sint-Andries (BE); Michael J. Digman, Denver, PA (US)

(73) Assignee: CNH America LLC, Racine, WI (US)

( * ) Notice: Subject to any disclaimer, the term of this patent is extended or adjusted under 35 U.S.C. 154(b) by 195 days.

This patent is subject to a terminal disclaimer.

(21) Appl. No.: 10/475,739

(22) PCT Filed: Apr. 29, 2002

(86) PCT No.: PCT/EP02/04961

§ 371 (c)(1),
(2), (4) Date: Oct. 23, 2003

(87) PCT Pub. No.: WO02/087313

PCT Pub. Date: Nov. 7, 2002

(65) Prior Publication Data
US 2004/0112025 A1   Jun. 17, 2004

(30) Foreign Application Priority Data
Apr. 30, 2001   (GB) .................................. 0110516

(51) Int. Cl.
*A01D 75/18* (2006.01)

(52) U.S. Cl. .................................................. 460/106
(58) Field of Classification Search ................ 460/105, 460/106, 119; 56/364, 330, 14.5, 208, 122; 198/733, 498, 749, 300–312, 510.1–515, 198/810.04
See application file for complete search history.

(56) References Cited

U.S. PATENT DOCUMENTS

| | | | |
|---|---|---|---|
| 1,934,160 A | | 11/1933 | Ballentine et al. |
| 2,696,290 A | | 12/1954 | Carroll |
| 3,468,112 A | | 9/1969 | Landgrebe |
| 3,785,472 A | | 1/1974 | Mathews |
| 3,981,125 A | | 9/1976 | Kerber et al. |
| 4,288,969 A | * | 9/1981 | Underhill .................... 460/105 |
| 5,324,231 A | * | 6/1994 | Van Herpe et al. ......... 460/106 |
| 6,471,032 B1 | * | 10/2002 | Busschaert et al. ......... 198/312 |

* cited by examiner

Primary Examiner—Robert E Pezzuto
(74) Attorney, Agent, or Firm—Brant T. Maurer; Rebecca Henkel (57) ABSTRACT

An agricultural harvesting machine comprises a crop processing apparatus and an elevator assembly for conveying harvested crop material to the crop processing apparatus. The elevator assembly comprises an elevator housing and an endless elevator apparatus mounted for rotation in the housing, the elevator apparatus having lower and upper lower runs. A shielding mechanism, such as an intermediate plate, shields the lower elevator run from the upper run. The intermediate plate is provided with at least one aperture enabling passage therethrough of crop material, and at least one removable cover for closing the aperture.

17 Claims, 6 Drawing Sheets

ELEVATOR FOR AN AGRICULTURAL HARVESTING MACHINE

FIELD OF THE INVENTION

The present invention relates to an elevator for an agricultural harvesting machine which is equipped for collecting crop material from a field and processing the same. In particular, it relates to the elevator which conveys the collected crop to the crop processing apparatus.

BACKGROUND OF THE INVENTION

Agricultural harvesting machines such as combine harvesters generally are developed to handle a large variety of crops. For example a combine harvester may be used to harvest small grain crops such as wheat and rye, rape or grass seed or large grain crops such as peas or corn. In this manner the use of the harvester, which is a high investment tool, can be extended over a longer season.

Conventionally the harvester is equipped with a detachable crop collecting attachment, such as a grain or corn header, which cuts the stems of the crop standing in the field and conveys the same to the inlet of an elevator housing. Alternatively crop which has been cut previously can be lifted up from the field by a pick-up attachment and conveyed to the same inlet. An elevator apparatus, commonly a chain elevator with transverse slats, grab the collected crop deposited in front of the inlet and convey it rearwardly and upwardly towards the crop processing apparatus, conventionally a threshing drum and concave or grate assembly.

As illustrated by U.S. Pat. No. 3,758,472, the crop usually is engaged by the lower run of the chain elevator to transport it along a bottom plate of the elevator housing. The upper run is shielded from the lower run by a backing plate which extends between the front and rear transverse shafts of the elevator. This plate reduces the chances that material which was not removed from the elevator by the threshing system, falls back on top of the lower run and gets lodged between the chains and the sprockets driving the chains near the exit of the elevator. The backing plate equally provides additional support for the upper run of the chains.

When the machine is harvesting long-stemmed crops, the intermediate plate should extend forwardly as far as possible to ensure the return material is deposited in front of the conveyor.

When harvesting corn there is no immediate danger of stem material getting wrapped around the shafts of the elevator. Corn headers for combines usually have snaprolls for removing the corn ears (cobs) from the stems and the headers convey only these ears to the elevator entrance. Near the elevator outlet most of the ears are immediately grasped by the threshing apparatus, but some ears may escape and are engaged by the returning slats on top of the backing plate. These ears slide over the backing plate towards the front of the elevator, where they forcefully hit the so-called anti-dust plate which is installed at the front end of the elevator. The returning cobs cause premature wear and deformation of this front plate. It is an object of the invention to remedy thereto without compromising the proper operation of the conveyor during the harvest of small grains.

The operator needs easy access to the interior of the elevator housing, e.g. for removal or installation of the backing plate, for inspection and replacement of the elevator slats, for removal of stray material from the shafts, etc. Commonly, the top wall of the housing has an aperture which is closed by a cover or by a door, as illustrated in U.S. Pat. No. 3,981,125. Herein the door is connected by a hinge to the upper rim of the aperture. The size of the aperture is limited as the door has to swing open in the confined area below the steering platform. To provide additional access the top wall of the housing is provided with removable panels which are bolted onto housing frame. Such arrangement does not allow for a quick access to a larger portion of the elevator.

SUMMARY OF THE INVENTION

According to one aspect of the invention there is provided an agricultural harvesting machine comprising a crop processing apparatus and an elevator assembly for conveying harvested crop material to the crop processing apparatus, the elevator assembly comprising:
  an elevator housing;
  an endless elevator apparatus mounted for rotation in the housing, the elevator apparatus having lower and upper lower runs; and
  a shielding mechanism shielding the lower run from the upper run,
  characterized in that each shielding mechanism is provided with at least one aperture enabling passage therethrough of crop material, and at least one removable cover for closing the aperture.

When the harvested crop material contains long stems, which easily wrap around the drive shaft of the elevator assembly, the cover is installed to prevent the crop material from falling on top of the lower run. When substantially heavy crop parts are ingested, such as corn ears, the covers can be removed such that returning crop parts are trapped in the aperture before they hit a front plate of the elevator assembly or an auger of the header.

Preferably, the aperture is provided in a front portion of the shielding mechanism in order to reduce the risk that crop material wraps around the rear axle of the elevator. The shielding may comprise a set of preferably juxtaposed apertures which extend substantially the full width of the shielding. In this manner it is possible to catch corn cobs over the full width of the elevator.

The cover may be provided with a profiled front edge for hooking over a front border of the aperture, such that the cover may be easily installed and removed.

According to another aspect of the invention, there is provided an agricultural harvesting machine comprising a crop processing apparatus and an elevator assembly for conveying harvested crop material to the crop processing apparatus, the elevator assembly comprising:
  an elevator housing;
  an endless elevator apparatus mounted for rotation in the housing; and
  a hatch mechanism for gaining access to the interior of the housing,
  characterized in that the hatch mechanism comprises a split door.

This door arrangement makes it possible to provide a large service opening without needing a lot of space above the opening for rotating the door. This is particularly advantageous where the elevator housing is provided below the steering platform.

The split door may comprise a first lid and a second lid hingeably connected to the first lid, such that both door elements can be opened simultaneously. The first lid may by hingeably connected to the housing wall. In this manner the lids do not have to be put aside the machine during service operations.

The two lids may be locked in place by a single latch mechanism associated with one of the lids only. Such mechanism preferably comprises at least one hook for simultaneously preventing longitudinal and vertical movement of the lid. The hook may be attached to movable member and engage a lug. In one embodiment the movable member may be movably attached to the housing and the lug may be attached to the lid. Alternatively, the movable member may be provided on the lid and the lug on the housing.

In a simple, yet effective embodiment, the lug may have an extension for hooking over a longitudinal part of the hook. The movable latch member may be mounted for transverse movement to the housing. The extension may be profiled to make the hook and the latch member yield when the lid is closed.

The movable latch member may be linked to a pivotable member which is linked to a pivotable element, such as a hexagonal head, on top of the housing. The pivotable member may be adapted for pivotment by a tool. Preferably the pivotable element is disposed near a side of the housing for easy access for the operator.

BRIEF DESCRIPTION OF THE DRAWINGS

An agricultural harvester in accordance with the present invention will now be described in greater detail, by way of example, with reference to the accompanying drawings in which.

DETAILED DESCRIPTION OF THE PREFERRED EMBODIMENTS

The terms "grain", "straw" and "tailings" are used principally throughout this specification for convenience but it is to be understood that these terms are not intended to be limiting. Thus "grain" refers to that part of the crop material which is threshed and separated from the discardable part of the crop material which is referred to as "straw". Incompletely threshed crop material is referred to as "tailings". Also the terms "forward", "rearward", "left" and "right", when used in connection with the combine harvester and/or components thereof are usually determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

Figure 1:
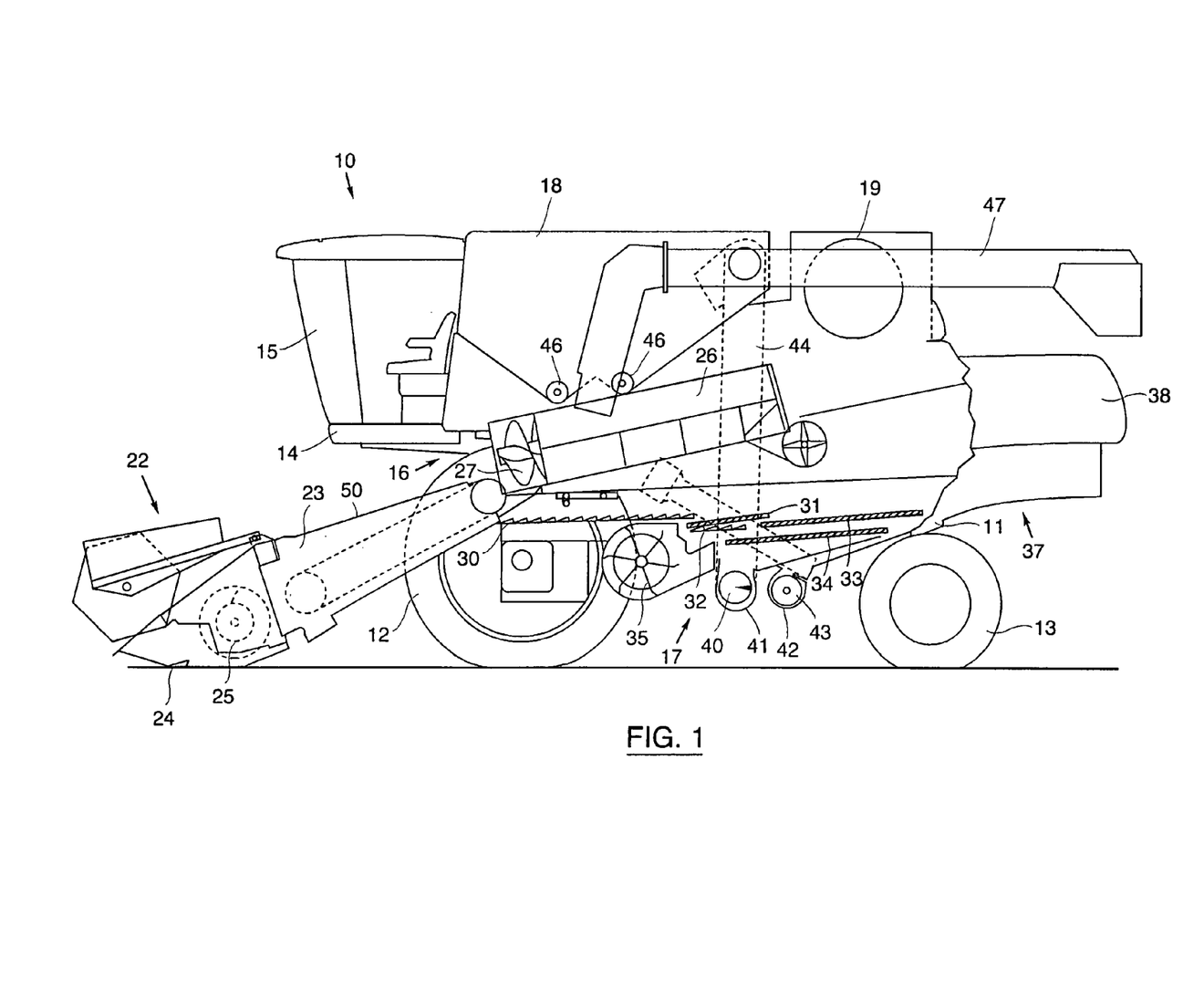
FIG. 1 is a diagrammatic, partly sectional side view of a combine harvester having a forwardly extending straw elevator.

The combine harvester 10 shown in FIG. 1 of the accompanying drawings, is of the axial-flow type, wherein crop material is threshed and separated while it is advanced by and along a longitudinally arranged rotor 27. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, a grain tank 18 and a power plant or engine 19. A conventional grain header 22 and a straw elevator assembly 23 extend forwardly of the main chassis 11 and are pivotally secured thereto for generally vertical movement which is controlled by appropriate actuators, such as hydraulic cylinders (not shown).

As the combine harvester 10 is propelled forwardly over a field with standing crop, the latter is severed from the stubble by a sickle bar 24 at the front of the header 22 and delivered by a header auger 25 to the inlet of the straw elevator assembly 23, which supplies the cut crop to the threshing and separating assembly 16.

The threshing and separating assembly 16 comprises a generally cylindrical chamber 26 in which a rotor 27 is rotated to thresh and separate the crop received therein, that is to say, the crop is rubbed and beaten between the rotors 27 and the inner surfaces of the chambers 26, whereby the grain, seed or the like, is loosened and separated from the straw.

Grain which has been separated by the threshing and separating assembly 16 falls onto a first grain pan 30 of the cleaning assembly 17 which further also comprises a pre-cleaning sieve 31, positioned above a second grain pan 32, a pair of sieves 33, 34, disposed the one above the other, and a cleaning fan 35. The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory movement spreads the grain across the sieves 31, 33, 34, while permitting the passage of cleaned grain by gravity through the apertures of these sieves. The grain on the sieves 31, 33, 34 is subjected to a cleaning action by the fan 35 which provides an air flow through the sieves to remove chaff and other impurities such as dust from the grain by making this material airborne for discharge from the machine through an outlet 37 of the straw hood 38.

Clean grain falls to a clean grain auger 40 in a clean grain auger trough 41 and is subsequently transferred therefrom by a grain elevator 44 to the grain tank 18. Tailings fall to a tailings auger (not shown) in a tailings auger trough 42. The tailings are transported sideways by the tailings auger to a separate rethresher 43 and returned by a tailings conveyor 45 to the cleaning assembly 17 for repeated cleaning action.

A pair of grain tank augers 46 at the bottom of the grain tank 18 is used to urge the clean grain sideways to an unloading tube 47 for discharge from the combine harvester 10.

Figure 2:
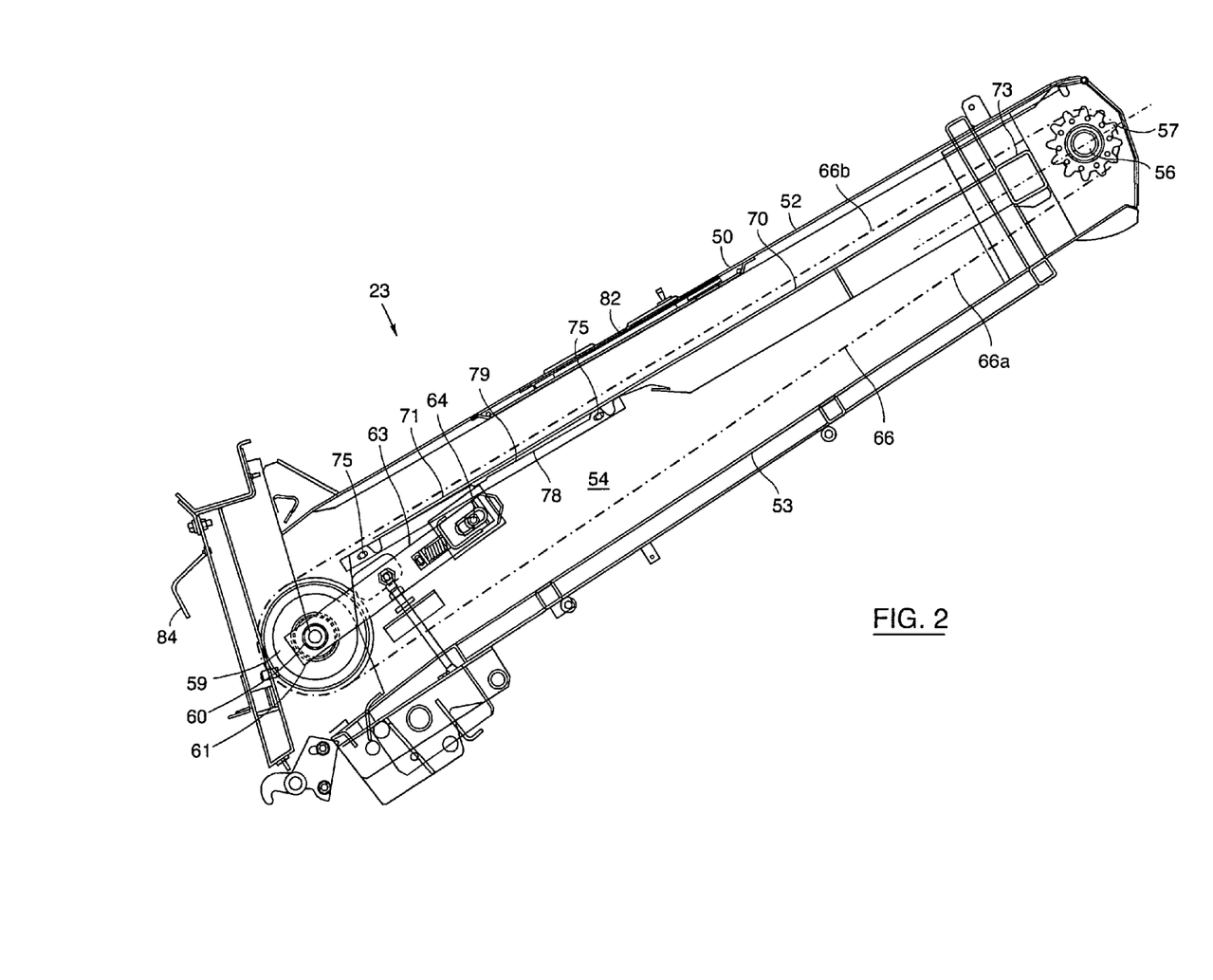
FIG. 2 is cross sectional view of the straw elevator of FIG. 1.

As shown in greater detail in FIG. 2, the straw elevator assembly 23 comprises a welded, substantially parallelepiped housing 50 which is pivotably secured to the main frame 11 below the operator's platform 14. The housing 50 comprises an upper wall 52 and a lower wall 53, interconnected by a pair of side walls 54. The rear end of the housing 50 is provided with a transverse drive shaft 56 which extends through the side walls 54 and is provided with a plurality of (e.g. four) sprockets 57. At the front end of the elevator assembly 23, a drum 59 is installed for rotation between the side walls 54. The drum has a front shaft 60 extending through apertures in the side walls and received in bearings 61 which are mounted to pivot arms 63. At their rear ends these arms 63 are pivotably affixed to the outside of the side walls 54 at pivots 64.

The elevator assembly 23 includes an elevator apparatus comprising a plurality of endless, flexible members, e.g. chains 66, which are trained along parallel paths over the sprockets 57 and the front drum 59. The chains are driven by the sprockets 57 on the drive shaft 56. Mounted across and to the chains is a plurality of generally transverse slats.

The lower wall 53 of the housing 50 may be provided with a wear plate along which the lower run 66a of the elevator apparatus conveys the harvested crop to the inlet of the threshing and separating assembly 16. During operation of the elevator assembly 23, the drive shaft 56 is rotated CCW as seen in FIG. 2 to make the slats adjacent the front drum 59 engage and grab the crop material which is delivered thereto by the header auger 25. The slats of the lower run 66a convey the crop rearwardly and upwardly along the lower wall 53 or the wear plate, if present, to the outlet of housing 50, where the crop is combed away from the elevator apparatus by the front portion of the threshing rotor 27.

In order to prevent that stray material that was not removed immediately from the elevator apparatus, falls back from the upper run 66b onto the lower run 66a and starts wrapping around the drive shaft 56 or accumulating around the sprockets 57, an intermediary shielding mechanism is provided between the lower and upper runs 66a, 66b of the elevator apparatus. In the present embodiment, the shielding mechanism consists of a stationary rear plate 70 and a removable front plate 71. The rear plate 70 is welded between and to the side walls 54 and to a transverse tubular reinforcement 73 disposed near the drive sprockets 57. The front plate 71 extends forwardly from the front edge of the rear plate 70 towards the front drum 59 and is attached by bolt members 75 to the side walls 54 of the housing 50.

The front and rear shielding plates 70, 71 may be provided with wear strips 76 arranged below the upper run 66b of the conveyor chains. The wear strips are intended for extending the life time of the plates along which the chains 66 are permanently moved during harvesting operation.

Figure 3:
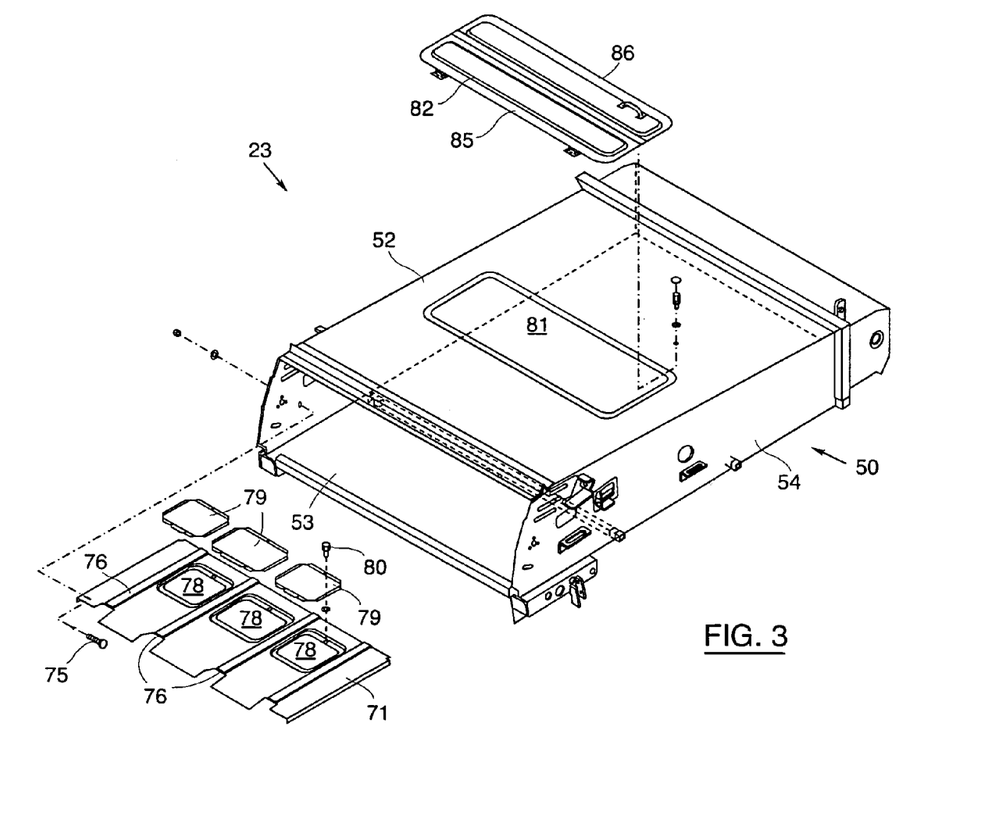
FIG. 3 is an isometric, partly exploded view of straw elevator of FIG. 1.

Between the path of the chains 66, the front plate 71 is provided with apertures 78 which are closed by covers 79. The covers 79 have a profiled front edge which hooks over the front border of the aperture 78. At their rear edge the covers 79 are provided with a flange portion which rests on the front plate 71 and which is secured thereto by bolt members 80. It is envisageable to install and remove the covers through the inlet of the feeder housing 50, especially where the apertures 78 are not remote from the front drum 59. Otherwise, as shown in FIG. 3, the upper wall 52 may be equipped with a service opening 81 and a hatch 82 above the apertures 78. The hatch can be opened for removal or installation of the covers 79 below the upper run 66b of the conveyor apparatus.

When the apertures 78 are closed, the shielding mechanism prevents that returning material is deposited on top of the lower elevator run 66a. Any stray material which was not removed from the slats near the outlet of the housing 50 is conveyed along the rear and the front shielding plates 70, 71 and finally mixes with the freshly harvested material which is delivered by the header auger 25 to the mouth of the elevator assembly 23.

When corn is harvested there is a chance that also some corn cobs (maize ears) or parts thereof are not immediately grasped by the threshing rotor 27 and move into the area above the rear shielding plate 70. The ears have a substantial mass and slide along the shielding mechanism to the front of the housing 50. There they may heavily impact and damage a front plate 84 which is attached above the mouth of the inlet. If the corn ears follow a somewhat lower trajectory, they hit the header auger 25. The auger body may be damaged and/or the auger flights may engage the corn and throw them upwardly or forwardly out of the header 22. To preclude such impacts, the covers 79 in the housing 50 are removed such that the corn ears can fall to the lower run 60b before they reach the front end of the housing.

When a combine harvester is used to harvest corn, it commonly is equipped with a dedicated header which separates the corn ears from the stems and feeds only the corn ears to the combine harvester. Accordingly the material ingested by the elevator assembly 23 contains no long, thin straw which is prone to being wrapped around the drive shaft 56. So, opening the apertures 78 does not create any supplemental wrapping hazards when corn is harvested.

The provision of the apertures 78 and removable covers 78 enables an effective and simple apparatus for adapting the straw elevator assembly 23 to harvesting either small grains or corn.

The shielding mechanism need not necessarily be provided with a plurality of juxtaposed apertures 78. It is also is envisageable to have one large aperture, extending substantially the full width of the housing 50 and being closed by a single, transverse cover.

Figure 4:
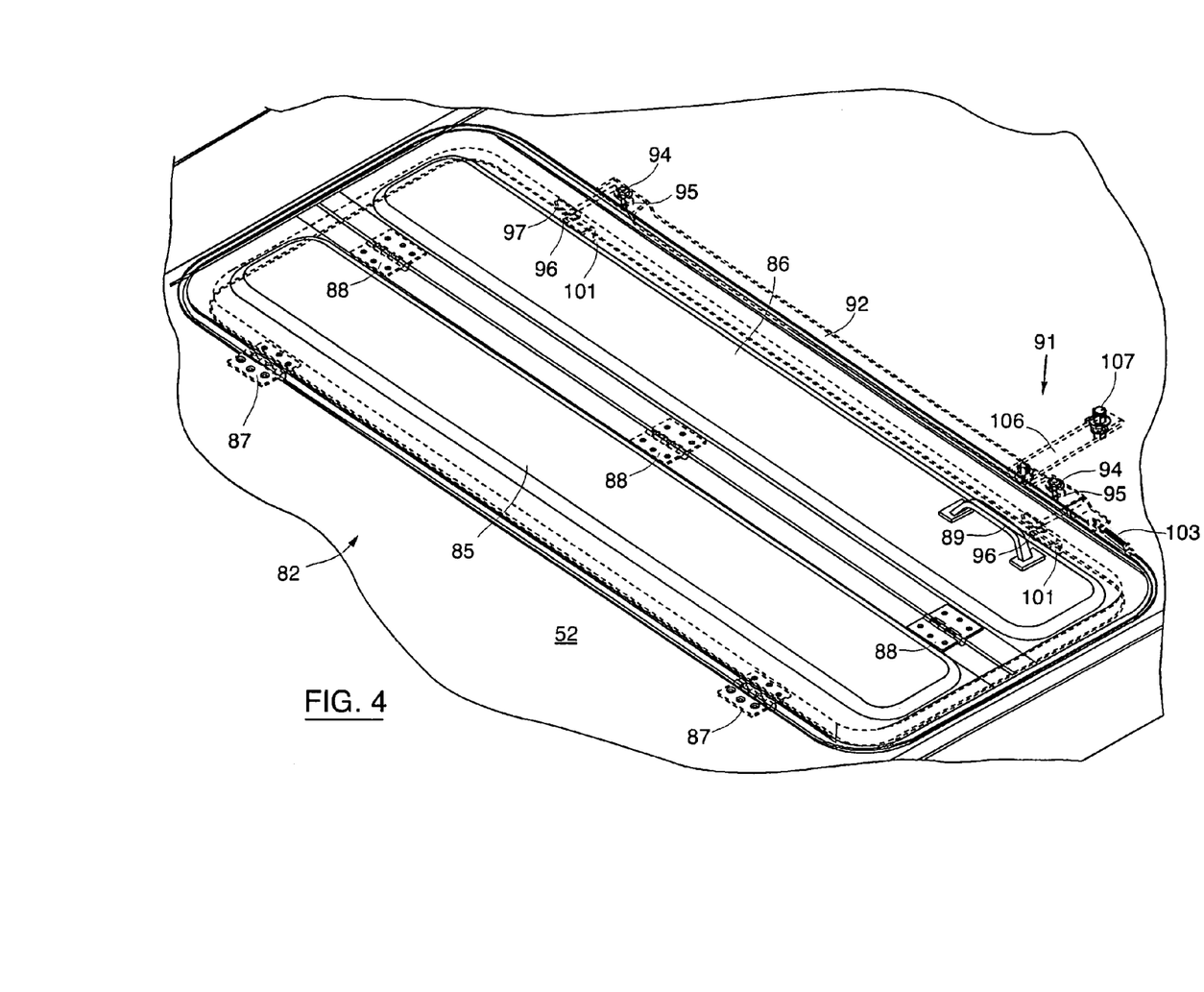
FIG. 4 is an isometric view of the top wall of the straw elevator of FIG. 2, showing a door closing an opening in this top wall.
Figure 5:
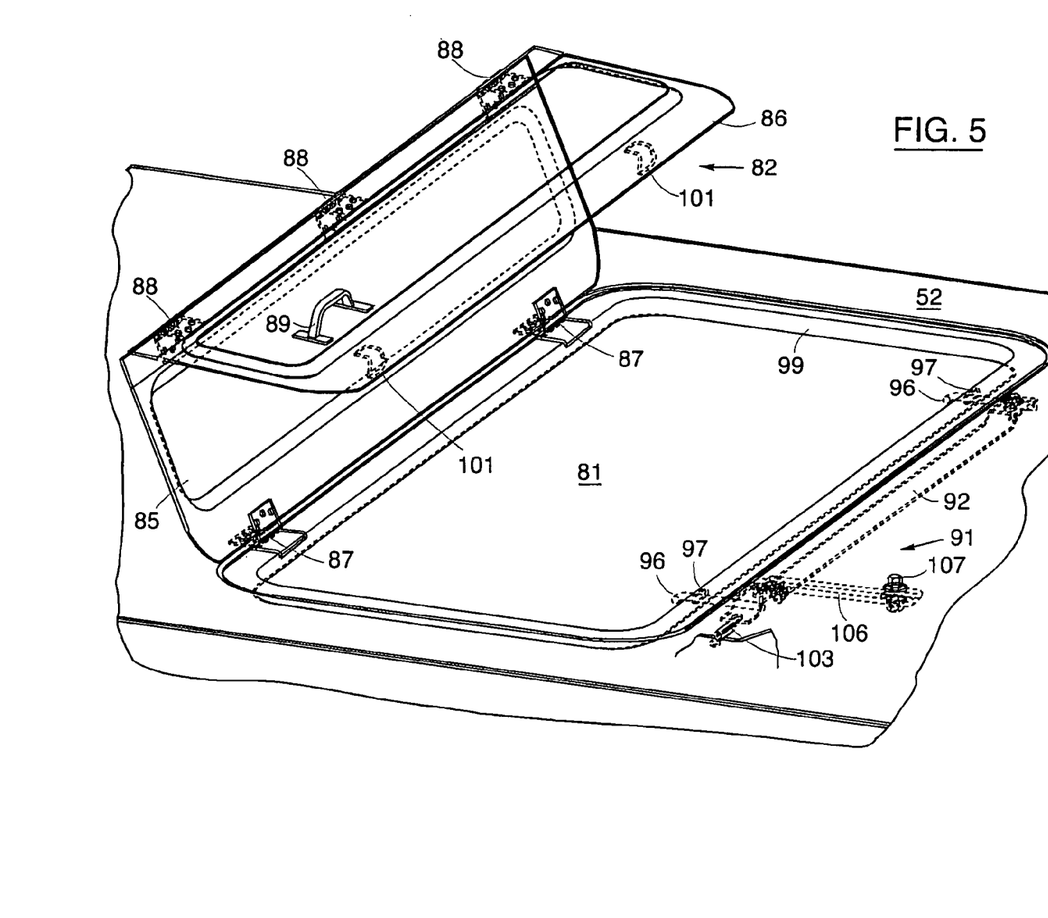
FIG. 5 is an isometric view of the top wall of FIG. 4, showing the door in a partly open position.
Figure 6:
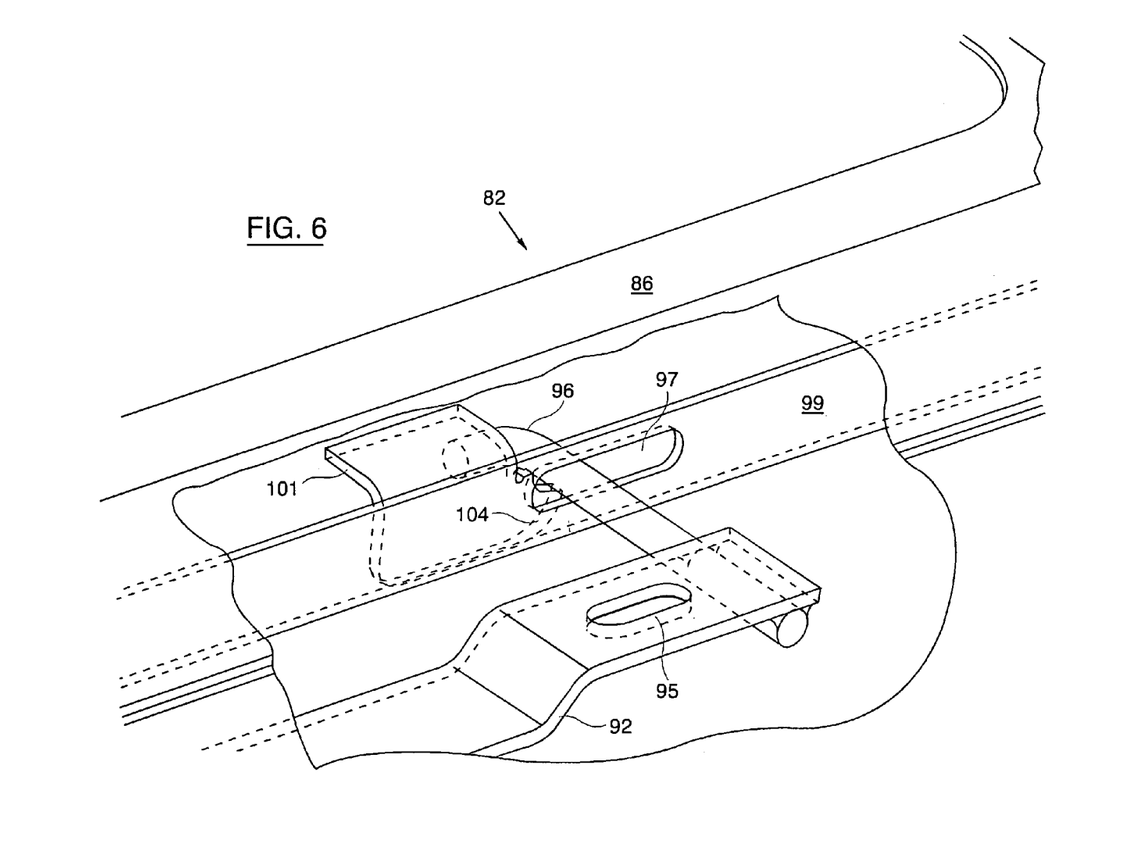
FIG. 6 is an isometric view of a detail of the lock mechanism of the door of FIG. 4.

The hatch 82 and its latch mechanism 91 are shown in further detail in FIGS. 4 to 6. The hatch is constituted by a split access door comprising a front lid 85, which is attached by a pair of hinges 87 to the front edge of the service opening 81, and a rear lid 86 which is attached by three hinges 88 to the rear edge of the front lid 85. The rear lid 86 is provided on its left side with a handle 89 allowing an operator standing on the left of the elevator assembly 23 to open the hatch 82 for gaining access to the interior of the elevator housing 50. As shown in FIG. 5, the rear lid 86 is raised, thereby raising also the rear of the front lid 85. The rear lid 86 is then pushed forwardly, whereby the front lid 85 rotates at its hinges 87 until it rests on top of the front portion of the upper wall 52. Finally, the rear lid 86 is deposited on top of the front lid 85. The use of such split door makes it possible to close a large service opening 81, even where the space above the housing 50 is seriously confined by the operator's platform 14 above. When fully opened, the lids 85, 86 assume a convenient, low and stable position in front of the opening, where they do not hinder access to the slats, the wear strips 76 or the covers 79 of the shielding plate 71.

The hatch 82 is closed by a latch mechanism 91 which equally is operated from the left side of the elevator housing 50. The mechanism 91 comprises a transverse control slat 92 which is mounted below the upper wall 52 adjacent the rear edge of the service opening 81. A pair of bolts 94 extending through slots 95 in the slat 92 slideably hold the slat against the inner surface of the wall 52. The slat 92 is provided with a first retainer system in the form of a pair of hooks 96 which extend into the area below the opening 81. The hooks are welded to the slat 92 adjacent the slots 95 and extend through transverse slots 97 provided in a downwardly extending rim 99 of the service opening 81. The hooks 96 co-operate with further retainer systems in the form of lugs 101 which are attached to the back of the rear lid 86. A spring 103 mounted between the housing 50 and the control slat 92 urges the latter sideways such that the hooks 96 are pulled against the lugs 101. The longitudinal part of the hook rests above an extension 104 of the lug 101 thereby preventing upward movement of the rear lid 86. The transverse part of the hook 96 is positioned over the transverse part of the lug 101, thereby preventing forward movement of the same lid 86. In this manner the latch mechanism 91 firmly holds in place the rear lid 86. Simultaneously, the front lid 85 is secured as it is caught between its hinges 87 and the secured rear lid 86.

Near the left side of the elevator housing 50, a lever 106 is pivotably connected to one end of the control slat 92. The other end of the lever 106 is affixed to the lower end of a hexagonal head 107 which extends through the upper wall 52. The head 107 and the affixed lever 106 can be rotated by a dedicated or standard tool, e.g. a wrench. A rotation over a small angle shifts the control slat 92 sideways against the force of the spring 103 and removes the hooks 96 from the lugs 101, such that the rear and front lids 86, 85 can be lifted and turned over.

When the head 107 is released, the spring 103 pulls the control slat 92 back to the left until the ends of the slots 95 contact the bolts 94. After service operations the operator uses the handle 89 to pull the hatch lids 85, 86 over the service opening 81. The extensions 104 of the lugs 101 contact the hooks 96 of the latch mechanism 91. The extensions are provided with an inclined lower border which pushes the hooks 96 sideways against the force of the spring 103, until the hooks slide over the tip of the extensions and assume their previous position over the lugs 101, thereby retaining the rear lid 86 as described above. Contrary to the opening operation, this closing operation requires no tooling. The weight of the hatch 82 or a small extra push suffices to make the hooks 96 slide over the lugs 101 and secure the hatch 82.

Although the present invention has been described with reference to a particular machine and structure, other embodiments can be thought of without departing however from the scope of the invention as defined in the claims. For instance it is possible to replace the two-lid hatch with a hatch comprising three or more lids.

The invention claimed is:

1. An agricultural harvesting machine comprising a crop processing apparatus and an elevator assembly for conveying harvested crop material to said crop processing apparatus, said elevator assembly comprising:
    an elevator housing;
    an endless elevator apparatus mounted for rotation in said housing, said elevator apparatus having lower and upper lower runs; and
    a shielding mechanism shielding said lower run from said upper run, characterized in that said shielding mechanism is provided with at least one aperture enabling passage therethrough of crop material, and at least one removable cover for closing said aperture.

2. An agricultural harvesting machine according to claim 1, characterized in that said at least one aperture is provided in a front portion of said shielding mechanism.

3. An agricultural harvesting machine according to claim 1, characterized in that said aperture or apertures extend substantially the full width of said shielding mechanism.

4. An agricultural harvesting machine according to claim 1, characterized in that said removable cover has a profiled front edge for hooking over a front border of said aperture.

5. An agricultural harvesting machine according to claim 4, characterized in that said removable cover is connected at its rear edge to said shielding mechanism by bolt members.

6. An agricultural harvesting machine comprising crop processing apparatus and an elevator assembly for conveying harvested crop material to said crop processing apparatus, said elevator assembly comprising:
    an elevator housing;
    an endless elevator apparatus mounted for rotation in said housing; and
    a hatch mechanism mounted on said housing for gaining access to the interior of said housing, characterized in that said hatch mechanism comprises a split door.

7. An agricultural harvesting machine according to claim 6, characterized in that said hatch mechanism is provided below a platform of said harvesting machine.

8. An agricultural harvesting machine according to claim 6, characterized in that said split door comprises a first lid and a second lid hingeably connected to said first lid.

9. An agricultural harvesting machine according to claim 8, characterized in that said first lid is hingeably connected to a wall of said housing.

10. An agricultural harvesting machine according to claim 8, characterized in that a single lid of said hatch mechanism is provided with a latch mechanism.

11. An agricultural harvesting machine according to claim 10, characterized in that said latch mechanism comprises at least one hook for simultaneously preventing longitudinal and vertical movement of said single lid.

12. An agricultural harvesting machine according to claim 11, characterized in that said hook is attached to a movable member and disposed for engagement of a lug.

13. An agricultural harvesting machine according to claim 12, characterized in that said movable member is movably attached to said housing and said lug is attached to said single lid.

14. An agricultural harvesting machine according to claim 12, characterized in that said movable member is linked to a pivotable element on top of said housing, said element being suitable for pivotment by a tool.

15. An agricultural harvesting machine according to claim 14, characterized in that:
    said pivotable element is disposed near one side of said housing; and
    said door is provided with a handle near the same side.

16. An agricultural harvesting machine according to claim 12, characterized in that said lug has an extension for hooking over a longitudinal part of said hook.

17. An agricultural harvesting machine according to claim 16, characterized in that said movable member is mounted for transverse movement to said housing.

* * * * *